INVENTOR:
OWEN J. BREADY

ATTORNEYS

Sept. 24, 1935.    O. J. BREADY    2,015,587
POWER IMPLEMENT
Filed Nov. 2, 1933    2 Sheets-Sheet 2
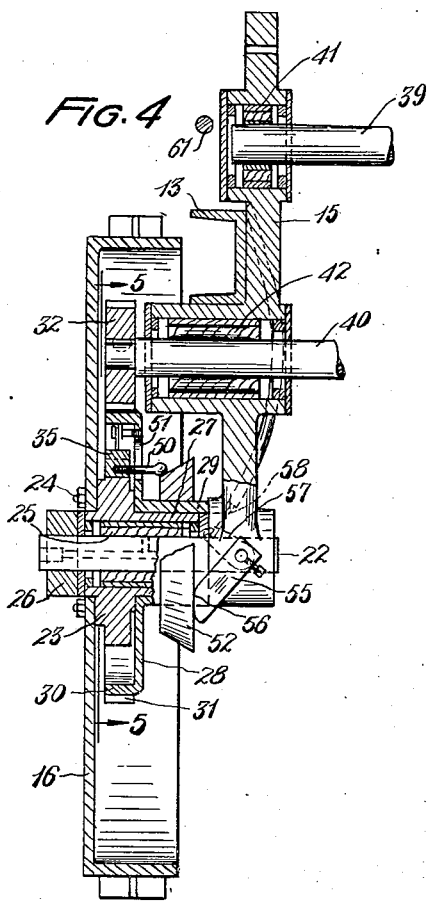
Fig. 4
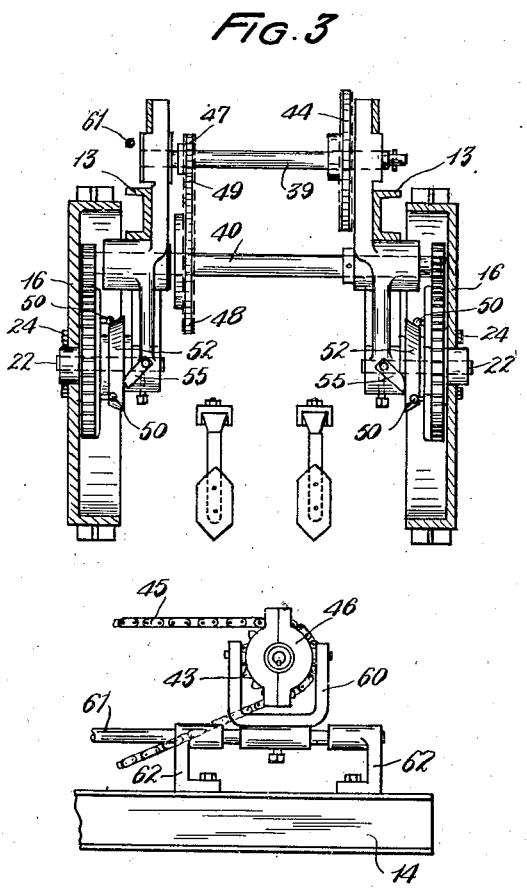
Fig. 3
Fig. 6
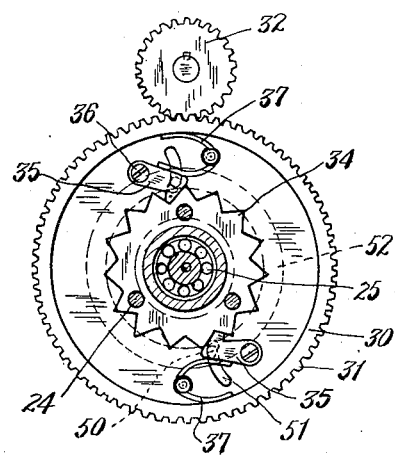
Fig. 5
INVENTOR:
OWEN J. BREADY
ATTORNEYS Patented Sept. 24, 1935

2,015,587

UNITED STATES PATENT OFFICE 2,015,587

POWER IMPLEMENT

Owen J. Bready, Cleveland, Ohio

Application November 2, 1933, Serial No. 696,407

6 Claims. (Cl. 180—17)

This invention relates generally to power implements and, more particularly, to an implement having a power driven carriage for actuating a tool such as an agricultural tool.

More specifically, my invention relates to, and is an improvement over, the type of power driven implement disclosed in my prior Patent No. 1,817,873, granted August 4, 1931, wherein the traveling carriage which actuates the tool is provided with traction wheels for supporting and propelling the carriage. As disclosed in my prior patent, the driving connections between the motor and the traction wheels include a ratchet mechanism at each wheel which provides a releasable connection such that when the clutch has been disengaged to disconnect the motor from the wheels, the implement can be manipulated by hand as when it is desirable to turn the implement around at the end of the field. Since the manipulation under these conditions must be done with the motor disconnected from the wheels, it has been necessary for the operator to expend considerable energy in making turns and in otherwise manipulating the implement.

To overcome this difficulty I have, as one of the objects of my invention, devised means whereby power from the motor may be selectively applied to the traction wheels for the purpose of turning, steering, or otherwise manipulating the implement.

Another object of this invention is to provide releasable driving connections for the traction wheels and manually operable control means for selectively rendering such driving connections effective or ineffective whereby power from the motor may be selectively supplied to the traction wheels for steering or otherwise manipulating the implement.

Yet another object of the invention is to provide an implement having traction wheels with releasable driving connections, and manual means for operating such connections including means movable in the direction of the axis of the axle shaft for rendering such releasable connection effective or ineffective.

A further object of the invention is to provide an implement, of the type referred to, having ratchet driven traction wheels and wherein manually operable means for selectively controlling the ratchet drives includes means movable along the axle shaft for actuating the ratchet pawl to render the driving connection to the ratchet wheel effective or ineffective.

It is also an object of this invention to provide a power driven implement, of the type referred to, which embodies novel clutch operating means; and which also embodies a novel arrangement for mounting a traction wheel on an axle shaft.

Other objects and advantages of the invention will be apparent from the following description when taken in conjunction with the accompanying sheets of drawings wherein, Fig. 1 is a side elevational view showing a power driven implement embodying my invention;

Fig. 3 is a vertical sectional view taken as indicated by the line 3—3 of Fig. 1;

Fig. 4 is a partial sectional view, on a different scale taken, through one of the shaft supporting brackets of the carriage;

Fig. 5 is an elevational view taken as indicated by the line 5—5 of Fig. 4; and

Fig. 6 is a partial side elevational view showing the clutch and the actuating means therefor.

Figure 2:
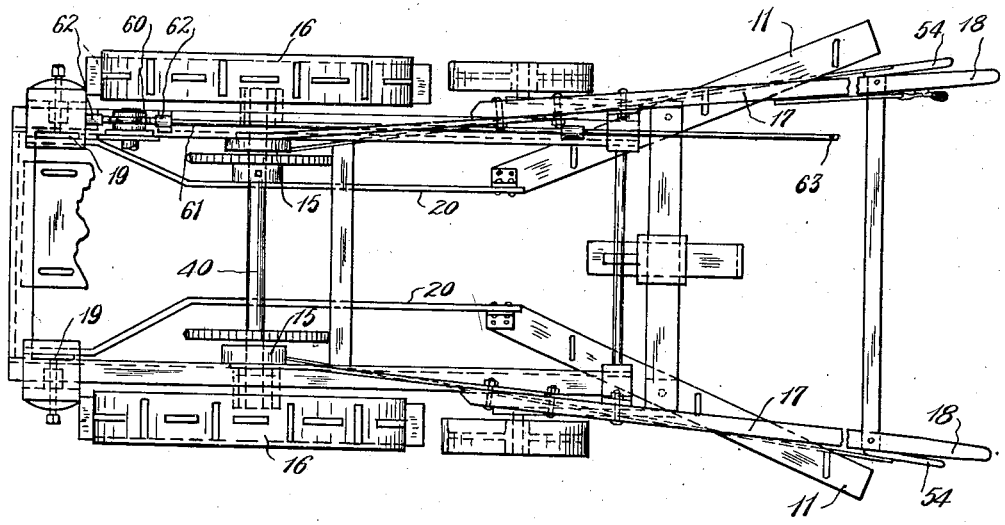
Fig. 2 is a top plan view thereof but with the motor removed from the carriage.

Detailed reference will now be made to the accompanying drawings illustrating an improved form of power driven implement of the type having a traveling carriage for actuating an agricultural or other tool. While I have illustrated in the drawings what I now regard to be the preferred form of my improved construction, it will be understood, of course, that the invention may be embodied in various structural arrangements other than that illustrated in the drawings.

Figure 1:
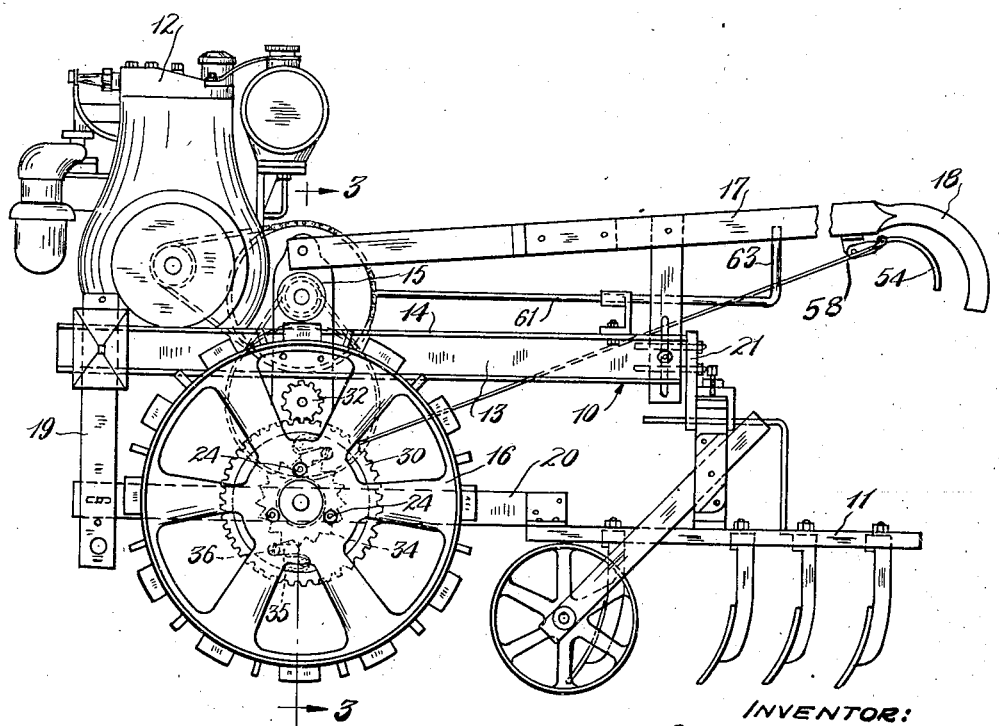

As shown in Figs. 1 and 2 of the drawings, my improved implement comprises, in general, a traveling carriage 10 to which an implement such as the agricultural implement 11 may be attached, and a motor 12 which is supported on the carriage for propelling the same.

The carriage of my traveling implement may be of varied construction and, as shown in the drawings, may comprise a frame structure 13 having spaced longitudinal side members 14 with shaft supporting brackets 15 secured thereto, and a pair of supporting and propelling wheels 16. The frame structure may also include a pair of handles 17 which extend rearwardly from the carriage and are provided with hand grip portions 18 adapted to be gripped by the operator. Suitable tool connections may also be provided on the frame for operatively connecting the cultivating attachment 11, or any other desired tool, with the carriage. In this instance, the tool connections include a pair of vertically adjustable bars 19 depending from the forward end of the frame and to which the tool 11 is connected by means of draw-bars 20, and an adjustable connection 21 between the tool 11 and the rear end of the carriage. A more detailed description of the tool and connections therefor is deemed unnecessary since these elements do not constitute an important part of the present invention.

For supporting the carriage upon the traction wheels 16, I provide the brackets 15 with stub axle shafts 22 which are non-rotatably held in the brackets and project laterally outwardly therefrom. If desired, these stub shafts could be connected together as a single shaft extending transversely through both of the depending brackets 15, but to provide an arch beneath the carriage to accommodate growing vegetation, I prefer to use separate stub shafts for the traction wheels. As seen in Fig. 4 of the drawings, the traction wheels 16 are not journaled directly upon the stub shafts 22 but are detachably connected to wheel hubs 23, by means of suitable bolts or studs 24, and these wheel hubs are journaled on the stub shafts with anti-friction roller bearings 25 therebetween. The wheel hub 23 may be retained on its stub shaft by means of a retaining member such as a suitable collar or nut 26 which is keyed or otherwise connected to the stub shaft outwardly of the wheel hub.

The wheel hub 23, as shown in Fig. 4 of the drawings, is preferably provided with a sleeve portion 27 which extends inwardly toward the bracket 15 and provides a support upon which the power wheel or gear wheel 28 is rotatably mounted. The gear wheel 28 may be constructed with a sleeve or hub portion 29, which is journaled on the sleeve portion 27 of the wheel hub 23, and with a drum portion 30 which is disposed around the wheel hub 23 in radially spaced relation thereto. A series of gear teeth 31 is provided on the outer periphery of the drum portion 30 for cooperation with the driving pinion 32.

To establish a releasable driving connection between the power wheel 28 and the wheel hub 23 I provide a ratchet mechanism between these coaxially arranged parts such that one element of the ratchet mechanism is carried by one part and the other element of the ratchet mechanism is carried by the other part. In this instance, the periphery of the wheel hub 23 is provided with a series of ratchet teeth 34 and the power wheel 28 is provided with one or more suitably arranged pawls 35 which cooperate with the ratchet teeth. The pawls 35 may be pivotally anchored on the power wheel 28 by means of anchor pins 36, and suitable springs 37 may be provided for normally urging the pawls into engagement with the teeth 34. From the arrangement as thus far described, it will be seen that upon rotation of the pinion 32 the power wheel 28 will be rotated on the sleeve portion of the wheel hub 23, but if the pawls 35 are in engagement with the ratchet teeth, a driving connection will be established between the power wheel and the wheel hub 23 and the power wheel and the wheel hub will then rotate together on the roller bearing 25 to thereby supply torque to the traction wheel 16. It will be understood, of course, that the arrangement of pawls and ratchet teeth is such that the power connection established thereby will supply torque to the traction wheel 16 so as to propel the carriage in the ahead direction.

As already stated the motor 12 is mounted on the frame structure of the carriage for the purpose of supplying power to the traction wheels 16, and although any suitable type of motor may be employed for this purpose, I prefer to use an efficient form of internal combustion engine. For transmitting power from the motor to the driving pinions 32 with the proper torque value, I provide the countershaft 39 and the pinion shaft 40 which are supported in the brackets 15 by suitable bearings such as the anti-friction bearings 41 and 42. A driving sprocket 43 on the shaft of the motor is operatively connected to a sprocket 44 on the countershaft 39 by means of a drive chain 45. A suitable clutch device 46 may also be provided on the motor shaft for establishing a releasable driving connection between the motor shaft and the sprocket 43. The shafts 39 and 40 are provided respectively with sprockets 47 and 48, which sprockets are connected by a drive chain 49 for the transmission of power from the countershaft 39 to the pinion shaft 40. It will be understood, of course, that the driving pinions 32 are keyed or otherwise secured to the pinion shaft 40 outwardly of the brackets 15, so that the power transmitted through the clutch 46 and through the shafts 39 and 40 may be applied to the power wheels 28 for delivery to the traction wheels 16.

With reference to the mounting arrangement for the traction wheels it will be noted that the wheel hubs 23 run on the roller bearings 25 and that the extensions 27 of the wheel hubs provide plain bearing sleeves upon which the gear or power wheels 28 rotate. During operation of the implement under power from the motor, which constitutes the major portion of the period of operation, the wheel hubs 23 and the gear wheels 28 rotate together on the roller bearing 25 and it is only during the time that the traction wheels are disconnected from the gear wheels, that the latter rotate on the plain bearing sleeves 27. Hence it will be readily seen that the wheel and bearing arrangement which I have provided is a very compact, smooth-running and efficient one.

As an important feature of my invention, I provide means for selectively controlling the releasable connections between the power wheels 28 and their respective traction wheels 16, so that the delivery of power to the traction wheels from the motor may be discontinued entirely if it is desired to stop the implement or power may be supplied to either wheel independently of the other for the purpose of steering or otherwise manipulating the implement. Although various arrangements of structure may be provided to accomplish this desired purpose, I find that the releasable driving connections for the traction wheels can be efficiently controlled by the provision of manual means which includes means movable axially of the stub shafts 22 for rendering the driving connection effective or ineffective for supplying torque to the traction wheels. In the arrangement of control mechanism shown in the drawings (see Fig. 4), I provide each ratchet pawl 35 with an actuating part 50 which extends through an opening 51 in the power wheel 28. A cam member 52, preferably having substantially the form of a frustum of a cone, is slidably mounted on the sleeve or hub portion 29 of the power wheel for cooperation with the pawl actuating parts 50. As seen in Fig. 4 of the drawings, the cam member is arranged so that the tapered surface thereof will cooperate with the pawl actuating parts as the cam member is moved along the hub portion 29 toward or away from the power wheel 28. When the cam member is moved toward the power wheel the pawl actuating parts 50 slide on the cone surface of the cam member and are thereby urged outwardly away from the stub shaft 22 to disengage the pawls from the ratchet teeth 34. When the cam member is moved, or allowed to move, away from the power wheel 28 the actuating parts 50 slide downwardly on the cone surface allowing the springs 37 to move the pawls 35 into engagement with the ratchet teeth 34. When the cam member 52 is actuated to disengage the pawls from the ratchet teeth, it will be readily seen that the power wheel 28 will rotate freely on the sleeve portion 27 of the wheel hub and no power can then be supplied to the wheel hub or the traction wheel carried thereby. On the other hand, when the pawls are in engagement with the ratchet teeth, the power wheel 28 is operatively connected to the wheel hub and torque will be supplied to the traction wheel 16 as explained above.

It will be noted from Fig. 3 of the drawings that a cam member 52 is provided for each of the traction wheels 16, and while various means may be provided for actuating these cam members, I prefer to provide for this purpose manual means, which includes a lever 54 mounted on each of the handles 17 in a convenient location, such as immediately adjacent to the grips 18. In this instance the levers 54 are pivoted to the handles and are arranged below the grips 18 so that the levers will be readily accessible to the fingers of the operator without the need of him removing his hands from the grips. Any suitable linkage may be provided for operatively connecting the levers 54 with the respective cams 52 and, in this instance, I show a bell crank lever 55 mounted on each of the brackets 15 for co-operation with the cam member 52 adjacent thereto, and flexible cables or wires 58 connecting the levers with the bell cranks. The wires 58 are connected, respectively, to one arm of the bell crank levers and the other arm may be provided with a suitable contact portion 56 which engages the cam member 52 and pushes the cam member toward the power wheel 28 when the bell crank lever is swung on its pivot.

As already stated, a clutch 46 is provided, preferably on the motor shaft, for controlling the delivery of power by the motor, and as a further feature of my invention, I provide a novel arrangement of actuating means for this clutch. This novel actuating means, as shown in Figs. 1 and 6 of the drawings, includes a clutch actuating fork 60 and a rock shaft 61 for actuating the clutch fork. The rock shaft 61 is arranged to extend along one of the frame members 14 and is supported on such frame member by a plurality of suitable bearing brackets 62. The clutch actuating fork 60 is connected to the rock shaft adjacent the forward end thereof and the rear end of the rock shaft is extended beyond the frame member 14 and rearwardly into proximity with one of the handle grips 18. The rear end of the rock shaft is preferably provided with a lever portion 63 so that the shaft can be readily rocked by the operator to actuate the clutch.

During the operation of my improved implement, the operator actuates the clutch control lever 63 to engage the clutch and power will then be transmitted to the power wheels 28 and to the traction wheels 16 to propel the carriage in the ahead direction. To steer the implement in either direction the operator simply grips the lever 54 at the side to which it is desired to turn and actuation of this control lever disengages the pawls of the corresponding traction wheel, while the pawls of the other traction wheel remain in driving engagement. Thereupon the traction wheel corresponding with the control lever manipulated, stops rotating, while power is continued to be delivered to the other traction wheel, resulting in the implement being steered in the desired direction. After the implement has been turned to the desired extent, the release of the control lever 54 reestablishes the driving connection and torque will again be supplied to both of the traction wheels. If desired, the implement can be stopped by simply actuating both of the control levers 54 simultaneously, which results in the traction wheels being disconnected from the power wheels 28 and permits the carriage to be swung to either side or moved backwardly by the operator.

In the drawings illustrating my improved power driven implement, I have shown the implement as being provided with traction wheels of the cleat-carrying type, but it will be understood, of course, that pneumatically tired traction wheels or any other suitable form of traction wheel, may be employed.

From the foregoing description and the accompanying drawings, it should now be readily understood that I have provided an improved form of power implement wherein novel means is employed for selectively controlling the delivery of power to the traction wheels for the purpose of guiding the implement, and wherein such novel control means includes manually operable levers adjacent the handles of the implement and means movable in the direction of the axes of the traction wheels for rendering the power connections to the traction wheels effective or ineffective. It should also be readily understood that I have provided novel clutch actuating means for a traveling implement and have also provided a novel mounting arrangement for the cooperating power and traction wheels of a traveling implement.

While I have illustrated and described the improved apparatus of my invention in a detailed manner, it will be understood of course that I do not intend to be limited to the precise details of construction and arrangement of parts illustrated and described, but regard my invention as embodying such changes and modifications as do not involve a departure from the spirit of the invention and the scope of the appended claims.

Having thus described my invention, I claim:

1. In a power driven implement the combination of a frame having an axle shaft thereon, a motor on said frame, a traction wheel and a power wheel having telescoping hub portions arranged for rotation on said shaft, a tool connected with said frame, means operatively connecting said motor with said power wheel for driving the latter, means carried by one of said wheels and movable into engagement with the other wheel for establishing a driving connection therebetween, and manually operable means for selectively controlling the last mentioned connection including a substantially frusto-conical cam disposed around said telescoping hub portions and shiftable therealong for actuating the movable means.

2. In a power driven implement the combination of a frame having an axle shaft thereon, a motor on said frame, a traction wheel and a power wheel having telescoping hub portions arranged for rotation on said shaft, a tool connected with said frame, means operatively connecting said motor with said power wheel for driving the latter, means carried by one of said wheels and movable into engagement with the other wheel for establishing a driving connection therebetween, such movable means having an actuating part extending through the power wheel, and a substantially frusto-conical cam disposed around said telescoping hub portions and shiftable therealong for cooperation with said actuating part.

3. In a power driven implement the combination of a carriage having an axle shaft thereon, a traction wheel and a power wheel having telescoping hub portions rotatable about said shaft, a tool connected with said carriage, a motor on said carriage, means operatively connecting said motor with said power wheel for rotating the latter, ratchet means providing a releasable driving connection between said power wheel and said traction wheel including a pawl having an actuating part extending through said power wheel, and manually operable means for selectively rendering the ratchet means effective or ineffective to establish said driving connection including a substantially frusto-conical cam member disposed around said telescoping hub portions and shiftable therealong for cooperation with said actuating part in causing actuation of said pawl.

4. In a power driven implement the combination of a frame having an axle shaft thereon, a motor on said frame, a traction wheel having the hub thereof journalled on said shaft, said hub having a projection thereon, a tool connected with said frame, a power wheel having a hub portion journalled on said projection, means operatively connecting the motor with said power wheel for rotating the latter, means providing a releasable driving connection between said power wheel and said traction wheel for driving the latter, and a manually operable control for said driving connection including a member guided on said hub portion for movement axially of said shaft.

5. In a power driven implement the combination of a frame having an axle shaft thereon, a motor on said frame, a traction wheel having the hub thereof journalled on said shaft, said hub having a projection thereon, a tool connected with said frame, a power wheel having a hub portion journalled on said projection, means operatively connecting the motor with said power wheel for rotating the latter, ratchet means providing a releasable driving connection between said power wheel and said traction wheel including a pawl having an actuating part extending through the power wheel, a substantially frusto-conical cam member guided on said hub portion for cooperation with said actuating part, and manual means for moving said cam axially of said shaft for causing actuation of said pawl.

6. In a power driven steering implement the combination of a frame having axle shafts thereon, handles projecting rearwardly from said frame, a motor on said frame, traction wheels having hubs journaled on said shafts, the hubs of said traction wheels having projections thereon, a tool connected with said frame, power wheels having hub portions journaled on the projections of said traction wheels, means operatively connecting the motor with said power wheels for rotating the latter, ratchet mechanisms providing releasable driving connections between said power wheels and said traction wheels including pawls having actuating parts extending through the power wheels, substantially frusto-conical cam members guided on said hub portions for cooperation with said actuating parts, and manual means for moving said cams axially of said shafts to cause actuation of said pawls including operating members disposed adjacent said handles.

OWEN J. BREADY.